United States Patent [19]
Forsythe

[11] 3,779,068
[45] Dec. 18, 1973

[54] PIPE JOINT TESTER

[76] Inventor: William R. Forsythe, 3052 Bertis Dr., Sacramento, Calif. 95821

[22] Filed: Dec. 6, 1971

[21] Appl. No.: 205,035

[52] U.S. Cl. .................................. 73/49.1, 138/90
[51] Int. Cl. ............................................. G01m 3/28
[58] Field of Search ....................... 73/49.1, 49.6; 285/13; 138/90

[56] References Cited
UNITED STATES PATENTS

| | | | |
|---|---|---|---|
| 2,481,013 | 9/1949 | Henderson | 138/90 |
| 3,194,466 | 7/1965 | Davis | 138/90 X |
| 3,338,088 | 8/1967 | Smith et al. | 73/49.1 X |
| 3,495,546 | 2/1970 | Brown et al. | 73/40.5 R X |

Primary Examiner—Richard C. Queisser
Assistant Examiner—Daniel M. Yasich
Attorney—Alexander B. Blair

[57] ABSTRACT

A pipe joint testing machine which moves internally of the pipe and has sealing tubes which circumferentially seal the pipe on opposite sides of the joint. Pressure is provided for applying air pressure between the seals against the joint so as to leak out and be detected by a pressure drop if the seal of the pipe joint is not air tight. Water is provided for wetting down the pipe joint should grouting to seal be required. An air compressor forms part of the machine for providing the compressed air both for testing and for supplying pressure to the water when required.

3 Claims, 3 Drawing Figures

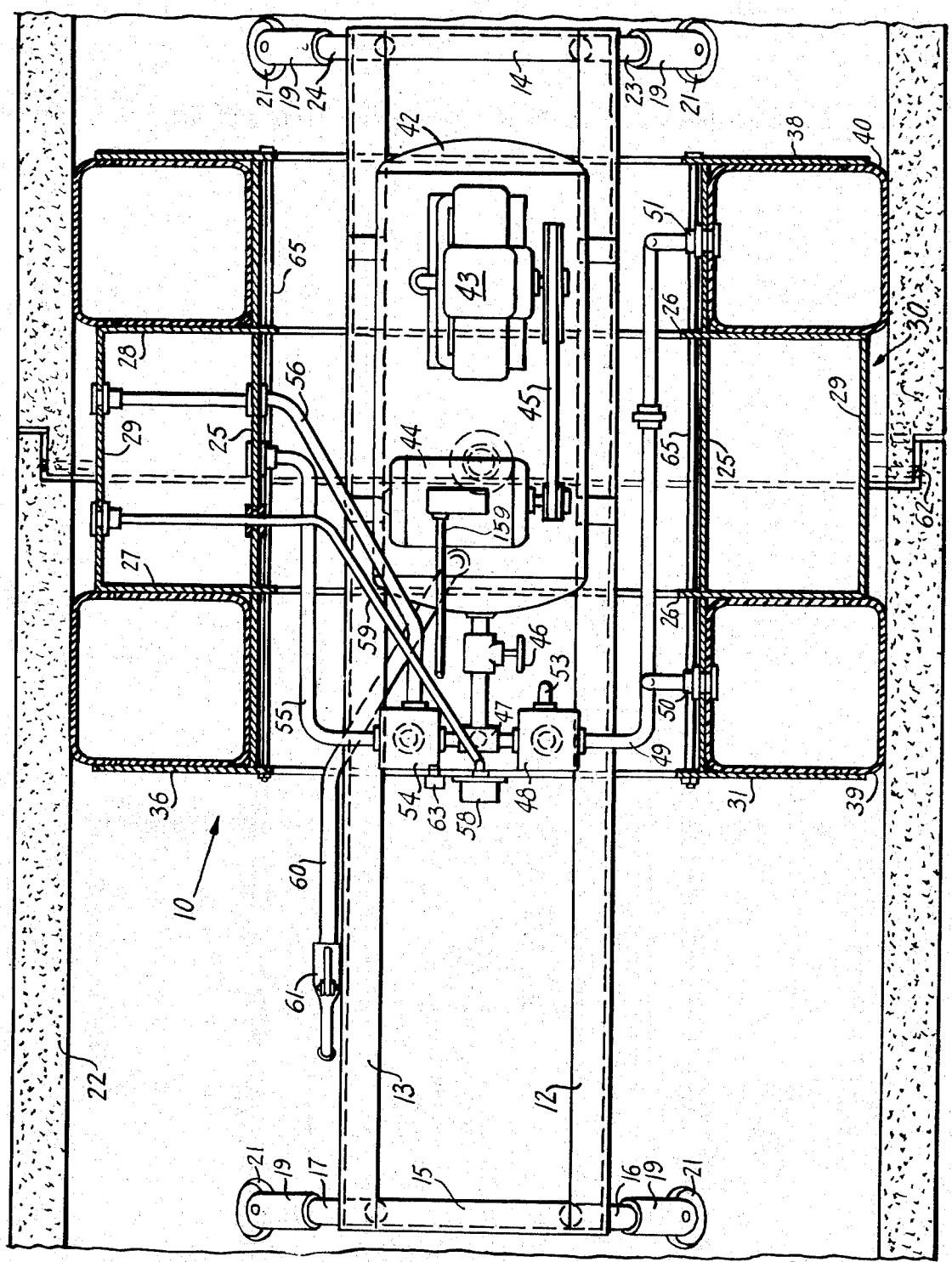

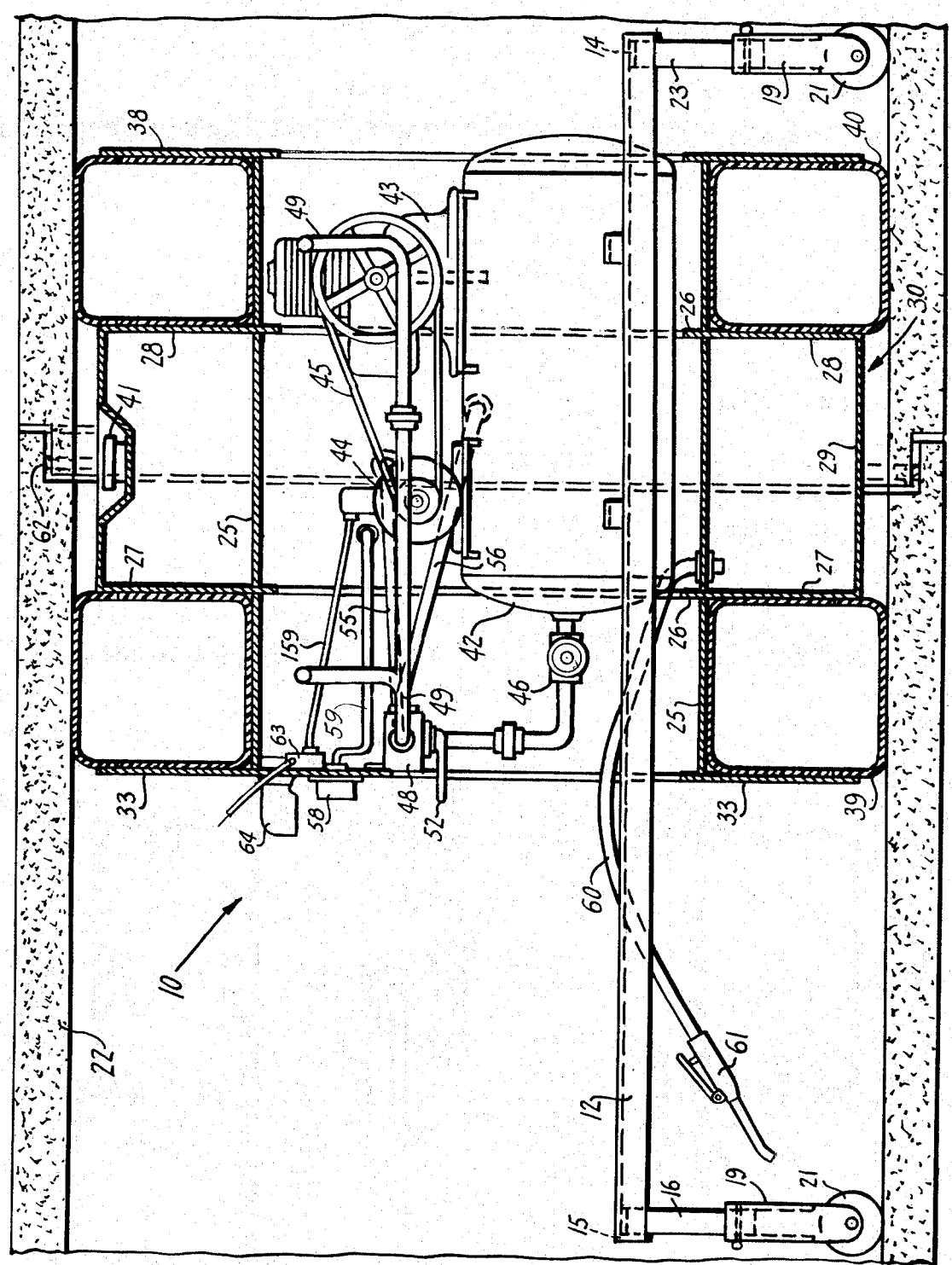

PIPE JOINT TESTER

BACKGROUND OF THE INVENTION

FIELD OF THE INVENTION

The present invention relates to manually actuated pipe joint pressure testing.

SUMMARY OF THE INVENTION

The pipe joint pressure tester is a machine adapted to be moved along internally of the pipe and stopped at each joint to be tested. The machine is provided with inflatable seals to circumferentially seal the pipe on opposite sides of the joint and an air pressure system to pressure the joint between the seals to determine by loss of pressure the presence of a leak in the seal. A water tank on the machine is adapted to be pressured with air to wet down the joint when sealing is required. An air compressor on the machine is provided for producing the air pressure for testing the seal and for pressuring the water tank.

The primary object of the invention is to provide a pipe joint testing machine which will test each joint directly with air pressure.

Other objects and advantages will become apparent in the following specification when considered in the light of the attached drawings.

BRIEF DESCRIPTION OF THE DRAWINGS

FIG. 2 is a longitudinal sectional view taken along the line 2—2 of FIG. 1 looking in the direction of the arrows; and FIG. 3 is a longitudinal vertical sectional view taken along the line 3—3 of FIG. 1 looking in the direction of the arrows.

DESCRIPTION OF THE PREFERRED EMBODIMENT

Figure 1:
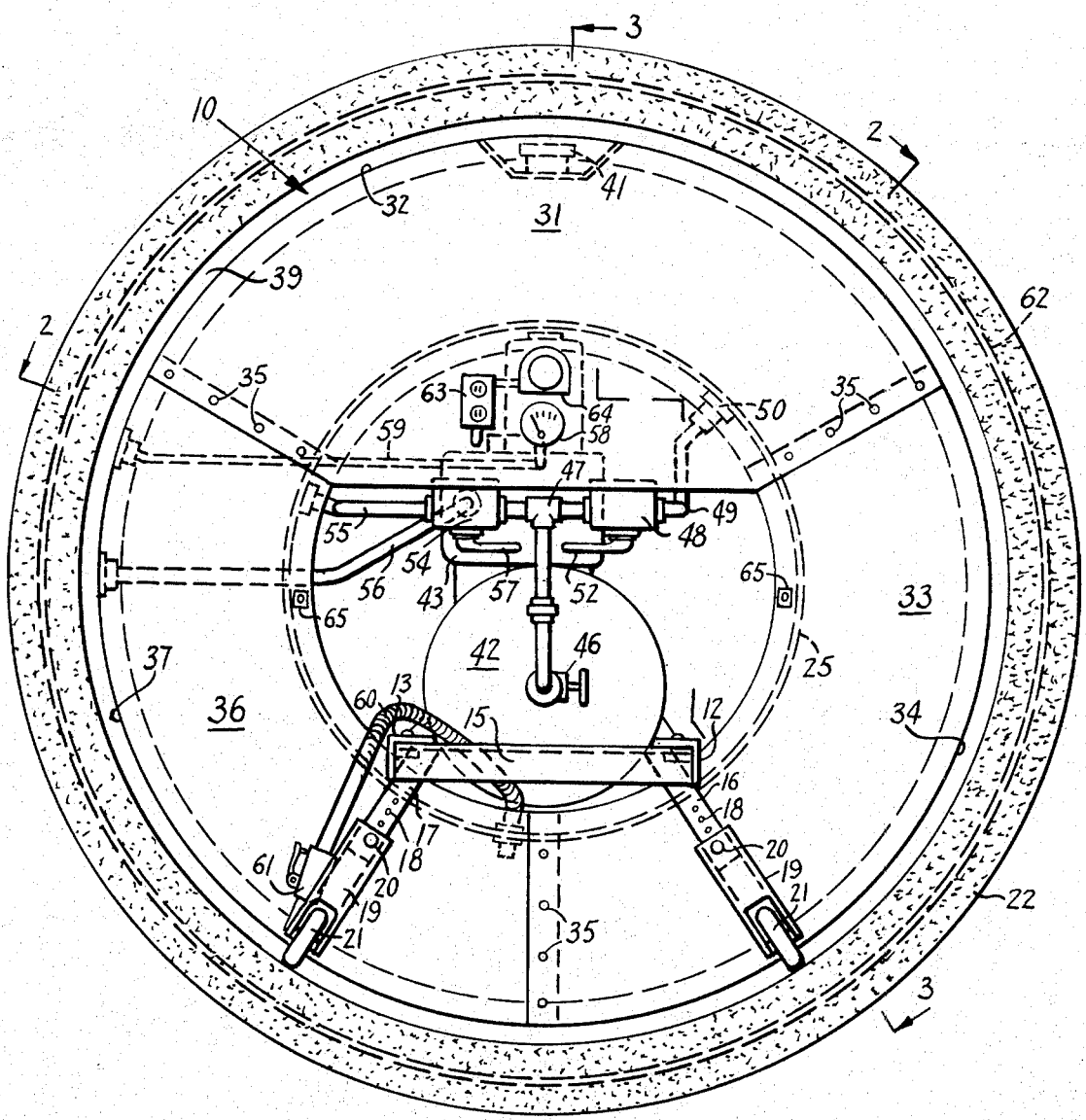
FIG. 1 is an end elevation of the invention shown in a pipe to be tested.

Referring now to the drawings in detail wherein like reference characters indicate like parts throughout the several figures the reference numeral 10 indicates generally a pipe joint leak testing machine constructed in accordance with the invention.

The machine 10 includes a pair of elongate generally horizontal spaced parallel frame members 12, 13 connected by transverse frame members 14, 15 at their opposite ends. A pair of diverging legs 16, 17 are secured to the frame members 12, 13 at the end thereof connected by the transverse frame member 15. The legs 16, 17 extend radially of the machine 10 and are provided with a plurality of vertically spaced transverse bores 18. A tubular fork 19 is engaged over each of the legs 16, 17 and is secured thereto by a pin 20 which extends through one of the bores 18 to adjustably mount the fork 19 to the legs 16, 17. Wheels 21 are journaled in the outer ends of the forks 19 for engagement with the inner face of a pipe 22.

Identical legs 23, 24 are secured to the ends of the frame members 12, 13 adjacent the transverse frame member 14 and similarly carry tubular forks 19 and wheels 21 on their lower ends. The wheels 21 support the framework 12, 13 for longitudinal movement through the pipe 22.

A cylindrical drum 25 is provided with internal ribs 26 and is mounted on the frame members 12, 13 with the frame members 12, 13 extending therethrough. A pair of spaced apart parallel annular partition walls 27, 28 are secured to the drum 25 and extend outwardly therefrom. A cylindrical outer wall 29 connects the peripheral edges of the partition walls 27, 28 and is arranged generally parallel to the drum 25 to form a tank generally indicated at 30.

A segment plate 31 is secured to the drum 25 at one end thereof and has a generally circular outer edge 32 with a diameter substantially equal to the generally cylindrical wall 29. A segment wall 33 has a generally circular outer edge 34 with the same diameter as the segment wall 31. The segment wall 33 is overlapped at one end by the segment wall 31 and is detachably secured thereto by a plurality of fasteners 35. A segment wall 36 has a circular outer edge 37 with the same diameter as the circular outer edges 32, 34. The segment wall 36 is overlapped at its opposite ends by the segment wall 31 and the segment wall 33 and is detachably secured thereto by a plurality of fasteners 35. The segment walls 31, 33 and 36 together form a circular end wall for the drum 25. A similar segmented end wall 38 is detachably secured to the opposite end of the drum 25. An inflatable generally circular tube 39 is seated on the drum 25 between the partition wall 27 and the segments 31, 33 and 36 as can be clearly seen in FIGS. 2 and 3. A generally circular tube 40 is seated on the drum 25 between the partition wall 28 and the segmented end wall 38. The tubes 39, 40 when inflated project beyond the generally cylindrical wall 29 and the outer edges of the segmented walls 31, 33, 36 and the segmented wall 38 to engage the internal surface of the pipe 22 with a sealing contact.

The tank 30 is adapted to hold water for reasons to be described and is provided with a filler cap 41.

An air tank 42 is supported on the frame members 12, 13 within the drum 25 and has an air compressor 43 mounted thereon driven by an electric motor 44 through a belt 45. A main valve 46 is connected to the tank 42 and is hand controlled. A manifold 47 is connected to the valve 46 for distributing air therefrom. A valve 48 is connected to the manifold 47 and has a conduit 49 extending therefrom and connected through fittings 50 and 51 to the tubes 39, 40 respectively. A handle 52 extends from the valve 48 to control the pressure in the tubes 39, 40. An exhaust pipe 53 extends from the valve 48 to carry off the exhaust air when the valve 48 is set to deflate the tubes 39, 40.

A second two-way valve 54 is connected to the manifold 47 and has a pipe 55 extending to the water tank 30 and a second pipe 56 extending to the space between the tubes 39, 40 and outside the cylindrical wall 29. A handle 57 on the valve 54 permits the valve 54 to selectively direct air to the tank 30 or to the pipe 56 as desired.

A pressure gauge 58 is mounted on the plate 31 and is connected by a conduit 59 to the space between the tubes 39, 40 and outside the cylindrical wall 29. A flexible hose 60 is connected to the tank 30 at one end and has a nozzle 61 on the other end for reasons to be assigned.

In the use and operation of the invention the leak tester 10 is rolled into a pipe 22 on the wheels 21 with the tubes 39, 40 deflated. When the tube 39 is on one side of a joint 62 and the tube 40 is on the opposite side of the joint 62 the valve 48 is actuated to inflate the tubes 39, 40 to seal the space between the tubes 39, 40 and outside the cylindrical wall 29 to prevent the escape of air therefrom. The valve 54 is then actuated to feed air pressure through the pipe 56 into the space between the tubes 39, 40 and outside of the cylindrical wall 29 until a predetermined pressure is reached. The air pressure gauge 58 is then observed for a short period to see if air pressure is leaking out through the joint 62 to thus lower the pressure showing on the gauge 58. If no leak is found then the tubes 39, 40 are deflated by actuation of the valve 48 and the tester is moved on to the next joint to be tested. In the event that a leak is found the hose 60 and nozzle 61 are used after the tester 10 is moved forwardly to wash the joint 52 prior to applying grouting thereto.

An electric cable partly shown in FIG. 3 extends from the tester 10 to a source of electricity and a switch 63 is provided on the plate 31 and connected by cable 159 to control the operation of the electric motor 44 to thus operate the compressor 43. An electric light 64 is mounted on the plate 31 to illuminate the gauge 58 and the handles 52, 57.

Safety bolts 65 extend completely through the tester to secure the plates 31, 33, 36 and 38 to prevent dangerous blow ups of the equipment.

Having thus described the preferred embodiments of the invention it should be understood that numerous structural modifications and adaptations may be resorted to without departing from the spirit of the invention.

I claim:

1. An internal leak tester for joints in a large diameter pipe line comprising a generally horizontal frame, wheels supporting said frame for movement longitudinally within a pipe line, a generally cylindrical drum secured to said frame, a plurality of segment walls detachably secured to each end of said drum forming a circular annular wall at each end of said drum, a generally cylindrical annular wash water tank secured to said drum in spaced relation to said segment walls and forming therewith a pair of spaced apart annular channels on opposite ends of said drum, a pair of generally cylindrical inflatable tubes mounted on said drum in channels on opposite ends thereof for engagement with the internal surface of the pipe line on opposite sides of a joint therein, said tank on said drum sealing the space between said tubes creating a chamber between said tubes and an outer wall of said tank and overlying the joint to be tested, a electric motor driven air compressor air tank unit mounted on said frame within said drum for supplying air under pressure to said chamber and for inflating said tubes, means on said tester for controlling the inflation and deflation of said tubes, and means on said tester for monitoring the air pressure in said chamber for detecting a leak indicating drop in pressure in said chamber.

2. A device as claimed in claim 1, including a plurality of internal annular ribs formed on said cylindrical drum.

3. A device as claimed in claim 1 wherein the means for monitoring the pressure in said chamber comprises an air pressure gauge.

* * * * *